SYNCHRONOUS FILTER APPARATUS IN WHICH PASS-BAND AUTOMATICALLY TRACKS SIGNAL, USEFUL FOR VIBRATION ANALYSIS

Original Filed April 13, 1964 3 Sheets-Sheet 1

INVENTORS.
GLEN H. THOMAS &
ROBERT S. MORROW
BY [signature]
ATTORNEY

SYNCHRONOUS FILTER APPARATUS IN WHICH PASS-BAND AUTOMATICALLY TRACKS SIGNAL, USEFUL FOR VIBRATION ANALYSIS

Original Filed April 13, 1964 3 Sheets-Sheet 2

INVENTORS.
GLEN H. THOMAS &
ROBERT S. MORROW
BY [signature]
ATTORNEY

March 7, 1967 G. H. THOMAS ET AL 3,307,408

SYNCHRONOUS FILTER APPARATUS IN WHICH PASS-BAND AUTOMATICALLY TRACKS SIGNAL, USEFUL FOR VIBRATION ANALYSIS

Original Filed April 13, 1964 3 Sheets-Sheet 3

INVENTORS.
GLEN H. THOMAS &
ROBERT S. MORROW

BY T. N. [signature]

ATTORNEY

United States Patent Office 3,307,408

Patented Mar. 7, 1967

3,307,408
SYNCHRONOUS FILTER APPARATUS IN WHICH PASS-BAND AUTOMATICALLY TRACKS SIGNAL, USEFUL FOR VIBRATION ANALYSIS

Glen H. Thomas and Robert S. Morrow, Columbus, Ohio, assignors to International Research and Development Corporation, Worthington, Ohio, a corporation of Ohio Continuation of abandoned application Ser. No. 359,335, Apr. 13, 1964. This application Aug. 10, 1966, Ser. No. 571,646

7 Claims. (Cl. 73—462)

This application is a continuation of application 359,335, filed April 13, 1964, now abandoned.

This invention relates to electrical filtering apparatus of the type adapted to pass signals within a narrow band of frequencies while attenuating signals of all other frequencies. More particularly, the invention relates to a band-pass filter in which the tuned or center frequency may be varied electrically and continually if desired.

As is known, a band-pass filter is a circuit component designed to pass a predetermined band of frequencies while attenuating signals of all other frequencies. Most prior art filters are of the reactive type wherein the center frequency of the pass band can be varied only by physically adjusting a circuit component such as a resistor, capacitor or inductor. As a result, band-pass filters or the reactive type cannot be conveniently used where it is desired to provide a variable tuned frequency, and particularly a tuned frequency which can be continually varied or tracked as a function of a variable electrical signal. Ideally, a band-pass filter will pass a single frequency while attenuating all others. This ideal condition, however, cannot be attained with reactive band-pass filters which are unable to provide a sharp cut-off frequency on either side of the center or tuned frequency. That is, the response characteristics of such a filter are such that the attenuation more or less gradually increases on either side of the center frequency with the result that the frequency response curve is flared outwardly with gradually increasing attenuation as it departs from the center frequency.

Still another characteristic of reactive band-pass filters is the inherent phase shift which occurs in a signal of the tuned frequency passing through the filter.

While special synchronous filters have been provided in which the center or tuned frequency may be continually varied as a function of an electrical quantity, prior art filters of this type are expensive, highly complex and not altogether satisfactory. For example, most prior art synchronous filters, although capable of providing a center frequency continually tuned to track the frequency of an external source, are not able to automatically provide an output signal having a magnitude linearly proportional to, and a frequency identical to, an input signal of the desired frequency.

While the foregoing characteristics of conventional band-pass filters can be ignored in some circuit applications, in others they are highly objectionable. For example, in electronic vibration analyzing equipment, it often happens that two or more sources of unbalance are present in a piece of equipment and are generating vibrations of different frequencies, with the result that a composite electrical signal composed of several different frequencies is produced by an electromagnetic transducer in contact with the equipment. In order to derive a signal having the frequency of the part to be balanced, it becomes necessary to employ a band-pass filter which will separate a particular frequency associated with a single vibrating part from different frequencies in order to effect a balancing operation. Furthermore, in the case of an internal combustion engine or the like, there may not only be several sources of unbalance; but, in addition, the speed of rotation of the various parts of the engine cannot be accurately controlled. That is, the speed of an engine with a throttle adjustment set for 1500 revolutions per minute may actually vary from this value by, say, plus or minus 10 revolutions per minute. In this case, the frequency of the alternating current signal passing through the band-pass filter of the analyzing equipment will also vary. Since a phase shift occurs in a signal of varying frequency passing through a conventional band-pass filter, it has been common in the past to incorporate at the output of the filter some type of phase correcting means. Without such phase correcting means, the system cannot be used to accurately balance the equipment. Needless to say, it is highly desirable to provide a practical and inexpensive filter for such applications which does not cause a phase shift in the signal passing therethrough, and in which the pass band can be varied synchronously with changes in engine speed. This not only eliminates the necessity for a phase shift correction circuit at the output of the filter but also enables the use of a very narrow pass band on the order of a few cycles per second which can, in effect, "follow" variations in engine speed.

Accordingly, the principal objects of the invention include:

To provide band-pass filter apparatus in which the pass band can be varied continually or tracked as a function of a variable electrical quantity;

To provide band-pass filter apparatus which does not effect a phase shift in a signal passing therethrough;

To provide band-pass filter apparatus having a pass band with sharply defined cut-off frequencies on either side of the center or tuned frequency;

To provide band-pass filter means which gives an instant indication of the phase of the signal passing therethrough; and To provide synchronous band-pass filter apparatus which provides an output signal having a magnitude linearly proportional to, and a frequency identical to, an input signal, while providing infinite rejection at all but the center or tuned frequency.

In accordance with the invention, band-pass filter means is provided which does not operate on the conventional resonant circuit theory, but which rather incorporates a unique arrangement of signal multiplication circuits in a plurality of signal channels. The inveniton includes a plurality of oscillatory voltage sources all having the same predetermined frequency, but shifted in phase with respect to each other. As will be seen, the frequency of these voltage sources determines the tuned frequency of the filter and may be varied continually if desired. The multiplication circuits in each signal channel multiply an input signal with a respective one of the aforesaid oscillatory voltage sources to thereby produce composite electrical signals containing a direct current component and an alternating current component when the input signal has a frequency equal to that of the oscillatory voltage sources. When, however, the input signal is not at the reference frequency, only alternating current components are produced by the multiplication circuits. Therefore, by passing the outputs of the multiplication circuits through rejection networks which eliminate all alternating current components, complete rejection is effected when the input signal frequency is not at the reference frequency of the filter, this reference frequency being defined by the frequency of the original oscillatory voltage sources. When, however, the frequency of the input signal is at the reference frequency, the direct current components derived at the outputs of the rejection networks are multiplied by their respective individual oscillatory voltage sources, and the alternating current products thus produced are vectorially added. Assuming that the input signal is of the same frequency as the original oscillatory voltage sources, an output signal will be produced also having a frequency equal to the frequency of the oscillatory voltage sources and matched in phase with the input signal. When, however, the input signal is not of the frequency of the oscillatory voltage sources, multiplication of the signals in the manner described above will result in complete attenuation of the input signal.

The above and other objects and features of the invention will become apparent from the following detailed description taken in connection with the accompanying drawings which form a part of this specification, and in which.

Figures 1, 2, 3, 4A, 4B, 4C:
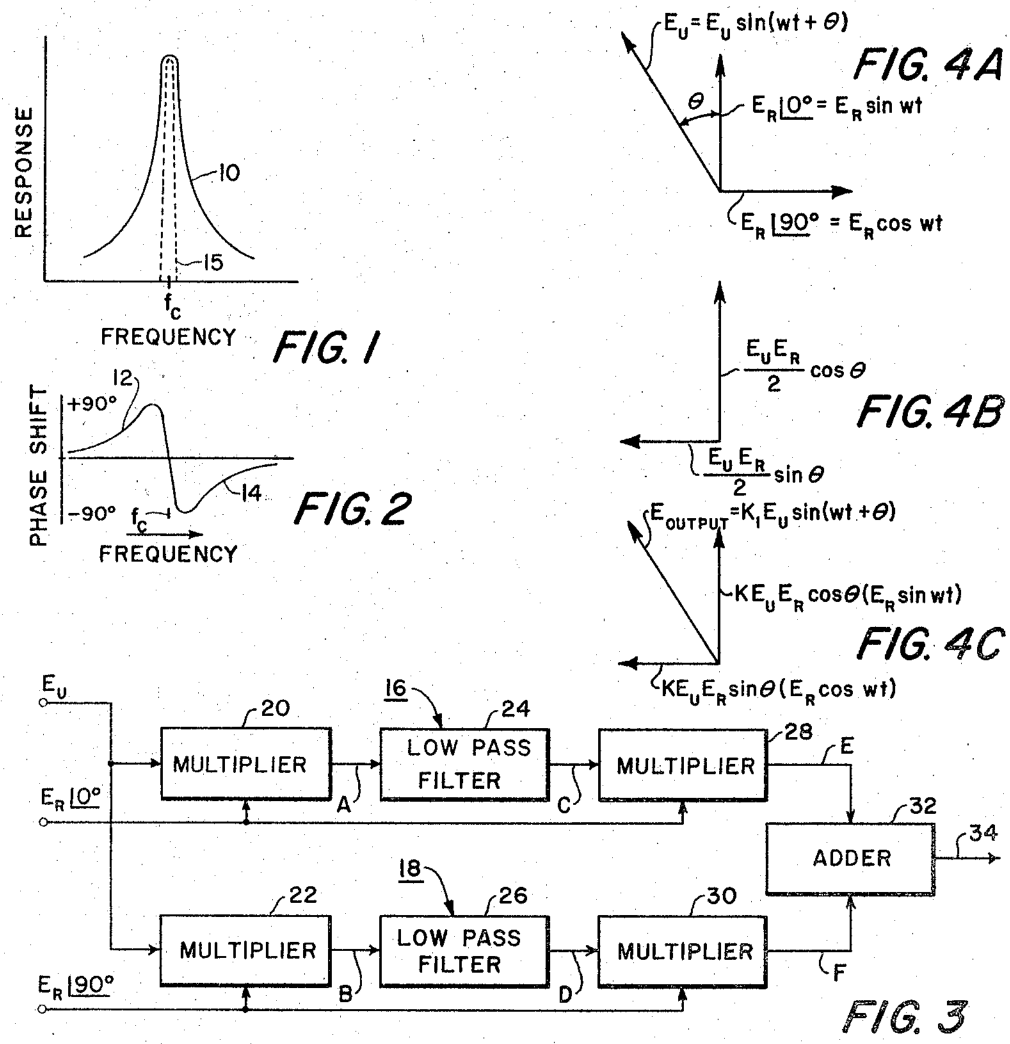
FIGURE 1 is a graph illustrating the response curve of a conventional band-pass filter as compared with that of the present invention.
FIG. 2 is a graph illustrating the phase shift characteristics of a conventional band-pass filter.
FIG. 3 is a block schematic diagram of one embodiment of the invention.
FIGS. 4A, 4B and 4C illustrate, by means of vector diagrams, operation of the circuit of FIG. 3.

Referring now to the drawings, and particularly to FIG. 1, the response curve of a conventional band-pass filter is shown and identified generally by the reference numeral 10. It will be noted that the response curve flares outwardly at its lower portions as it departs from the center frequency $f_c$. This, of course, results in a condition wherein only partial attenuation of an input signal is effected for frequencies immediately above or below the center frequency $f_c$.

In FIG. 2 the phase shift characteristics of a conventional band-pass filter are shown, and it will be noted that immediately above and below the center frequency $f_c$, the phase shift increases very rapidly to plus 90° and minus 90°, respectively. Thereafter, the phase shift decreases along the curves 12 and 14 until, at frequencies relatively far removed from the center frequency $f_c$, the phase shift approaches zero. In accordance with the present invention, a filter is provided having a response curve such as that shown by the dotted outline in FIG. 1 and identified by the reference numeral 15. It will be noted that in contrast to the response curve 10 of a conventional band-pass filter, extremely sharp cut-off frequencies on either side of the center frequency $f_c$ are provided. In other words, the attenuation increases to a maximum very abruptly with a change of as little as one cycle per second. Furthermore, in contrast to the phase shift characteristics of a conventional band-pass filter shown in FIG. 2, the filter of the present invention effects no phase shift whatever. Finally, the filter of the invention is capable of shifting the center frequency $f_c$ back or forth in synchronism with a variable electrical quantity, a feature heretofore unattainable with conventional band-pass filters.

With reference, now, to FIG. 3, one embodiment of the invention is shown which comprises a pair of signal channels 16 and 18 each of which includes a first multiplier circuit 20 and 22, respectively. Applied to multiplier circuit 20 is an oscillatory voltage source $E_R\angle 0°$ which may be represented by:

$$E_R \sin wt$$

Similarly, applied to multiplier circuit 22 is an oscillatory voltage source $E_R\angle 90°$ which is shifted in phase with respect to $E_R\angle 0°$ by 90° and which may be represented by:

$$E_R \cos wt$$

The signals $E_R\angle 0°$ and $E_R\angle 90°$ are multiplied in circuits 20 and 22 respectively by an input signal $E_U$ of unknown frequency. If this signal is of the same frequency, $w$, as $E_R\angle 0°$ and $E_R\angle 90°$ it may be represented by:

$$E_U \sin (wt+\theta)$$

where $\theta$ is the difference in phase between the input signal $E_U$ and $E_R\angle 0°$. As will be seen, the filter shown in FIG. 3 is designed to pass signals having the frequency $w$. Therefore, an input signal represented by the formula $E_U \sin (wt+\theta)$ will pass through the filter. However, a signal of another frequency $w_1$ will not pass through the filter. This signal will be represented by the formula:

$$E_U \sin (w_1 t)$$

The outputs of multiplier circuits 20 and 22 are passed through low-pass filters 24 and 26, respectively, which eliminate alternating components, leaving only direct current components which are applied to a second pair of multiplier circuits 28 and 30. In circuits 28 and 30, the direct current outputs of circuits 24 and 26 are multiplied with $E_R\angle 0°$ and $E_R\angle 90°$, respectively, thereby producing alternating current signals which are combined in adder 32 to produce an output at 34 when, and only when, the input signal $E_U$ is of the same frequency as $E_R\angle 0°$ and $E_R\angle 90°$.

Operation of the circuit of FIG. 3 may best be understood by reference to FIGS. 4A, 4B and 4C. In FIG. 4A vectors representing $E_R\angle 0°$, $E_R\angle 90°$ and $E_U$ are shown with $E_U$ being equal in frequency to $E_R\angle 0°$ and $E_R\angle 90°$. Thus, $E_R\angle 0°$ and $E_R\angle 90°$ are 90° out of phase with respect to each other while $E_U$ is shifted in phase with respect to $E_R\angle 0°$ by the angle $\theta$. Multiplication of $E_U$ by $E_R\angle 0°$ in circuit 20 may be represented mathematically as follows:

$$E_R \sin wt \times E_U \sin (wt+\theta) = \frac{E_R E_U}{2}[\cos \theta - \cos (2wt+\theta)]$$

Similarly, multiplication of $E_U$ by $E_R\angle 90°$ in circuit 20 may be represented as:

$$E_R \cos wt \times E_U \sin (wt+\theta) = \frac{E_R E_U}{2} \sin \theta + \sin (2wt+\theta)]$$

The voltages, $$\frac{E_R E_U}{2}[\cos \theta - \cos (2wt+\theta)]$$

and $$\frac{E_R E_U}{2}[\sin \theta + \sin (2wt+\theta)]$$

appear at points A and B in the circuit of FIG. 3, respectively. After passing through filters 24 and 26, the alternating current components are eliminated, leaving only the direct current components:

$$\frac{E_R E_U}{2} \cos \theta$$

and $$\frac{E_R E_U}{2} \sin \theta$$

respectively at points C and D in FIG. 3. These direct current voltages are vectorially represented in FIG. 4B.

The direct current components are then multiplied by $E_R\angle 0°$ and $E_R\angle 90°$, respectively, in circuits 28 and 30 to produce a signal represented by:

$$KE_UE_R \cos \theta\ (E_R \sin wt)$$

at point E in FIG. 3 and $$KE_UE_R \sin \theta\ (E_R \cos wt)$$

at point F. K is a multiplication constant associated with the circuitry and can be neglected for purposes of explanation. Perfect sine waves now appear at points E and F in the circuit of FIG. 3, these two signals shown in FIG. 4C having the same phase separation as $E_R\angle 0°$ and $E_R\angle 90°$ and an amplitude proportional to the unknown input signal $E_U$. Therefore, addition of the voltages at E and F in circuit 32 produces an output which is mathematically represented by:

$$K_1E_U \sin (wt+\theta)$$

This signal is of the same frequency as $E_R\angle 0°$ and $E_R\angle 90°$, has the same phase as $E_U$ at the input, and occurs only when the frequency of $E_U$ at the input is equal to the frequency of $E_R\angle 0°$ and $E_R\angle 90°$. It should be noted that no phase shift whatever has occurred in the signal in passing through the filter. Furthermore, the tuned or center frequency of the filter can be varied continually as a function of a continual variation in the frequency of $E_R\angle 0°$ and $E_R\angle 90°$.

Now, if it is assumed that the frequency of $E_U$ is not the same as that of $E_R\angle 0°$ and $E_R\angle 90°$, then $E_U$ may, for example, be represented as:

$$E_U = E_U \sin w_1t$$

where $w_1$ is a frequency different from the frequency $w$ of signals $E_R\angle 0°$ and $E_R\angle 90°$. Then, multiplication in circuit 20, for example, will produce:

$$E_U \sin w_1t \times E_R \sin wt = E_UE_R \sin w_1t \sin wt = \frac{E_UE_R}{2}[\cos (w_1-w)t - \cos (w_1+w)t]$$

A similar multiplication occurs in circuit 22, and it can be seen that the product contains no direct current component. Consequently, at all frequencies other than the frequency $w$, the filters 24 and 26 will reject everything, and no output appears.

Figure 5:
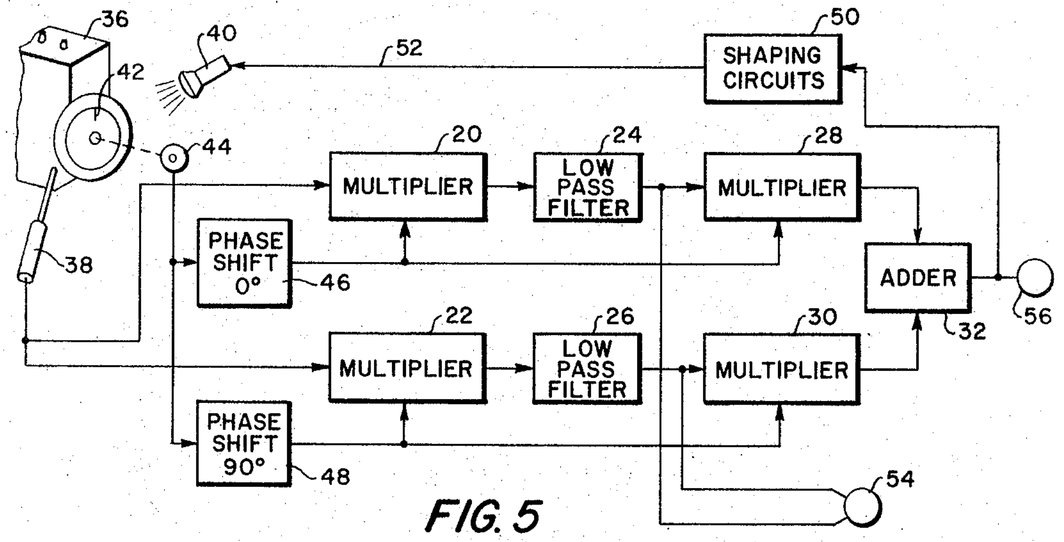
FIG. 5 illustrates a typical application for the circuit of FIG. 3.

In FIG. 5, an adaptation of the circuit of FIG. 3 to a simple vibration analyzing system is shown. The vibrations caused by the crankshaft, for example, of an internal combustion engine 36 are sensed by an electromagnetic transducer or vibration pickup 38. Suitable transducers for this purpose are described in U.S. Patent No. 2,754,435. The signal from the transducer 38 will be a composite oscillatory signal containing a plurality of sine waves, each of which has a frequency corresponding to the frequency of a particular vibrating part on the engine 36.

In order to balance the crankshaft, it is necessary to isolate the particular single frequency due to the vibrating crankshaft from frequencies due to other vibrating parts on the engine. Otherwise, it will not be possible to conduct a vibration analysis since a stroboscopic lamp 40 directed onto a mark 42 on the engine crankshaft cannot be made to fire at a frequency corresponding to the rotational speed of the engine. Furthermore, in the case of an internal combustion engine, there may not only be several sources of unbalance; but, in addition, the speed of rotation of the crankshaft cannot be accurately controlled. That is, the speed of an engine with a throttle adjustment set for 1500 revolutions per minute, for example, may actually vary from this value by, say, plus or minus ten revolutions per minute. The present invention provides a means whereby the signals picked up by the transducer 38 are filtered so as to eliminate all but the single frequency due to the vibrating crankshaft. At the same time, the pass band of the filter of the invention for eliminating unwanted frequencies will be locked in synchronism with variations in the speed of the crankshaft.

The foregoing is accomplished in accordance with the present invention by connecting to the crankshaft a tachometer 44 for producing a signal having a frequency equal to that of the rotational speed of the crankshaft, which signal varies in frequency as the speed of the crankshaft varies. Alternatively, the tachometer generator may be replaced by a photocell, responsive to light from a rotating mark on the crankshaft, for producing pulses which are applied to a sine wave generator with the same overall effect. This signal from the tachometer 44 is applied to phase shift circuits 46 and 48 which produce output signals corresponding to $E_R\angle 0°$ and $E_R\angle 90°$, respectively, described above. Similarly, the transducer 38 produces a signal corresponding to the signal $E_U$ in FIG. 3. These signals are applied to the multipliers 20 and 22 of the circuit of FIG. 3, the remainder of this circuitry operating in the manner described above in connection with FIG. 3. The output of adder 32, therefore, will be a sinusoidal voltage having a frequency equal to the rotational speed of the crankshaft, and which varies with variations in the speed of the crankshaft. Furthermore, this signal will be locked in phase with respect to the signal produced by transducer 38 due to a single vibrating part, namely the crankshaft. All other vibrational frequencies are eliminated by the low-pass filters 24 and 26.

The output of adder 32 is applied to conventional shaping circuits 50 which produce pulses on lead 52 which are locked in phase and frequency with respect to the sinusoidal voltage at the output of adder 32. These pulses on lead 52 are then applied to a phase indicating device such as stroboscopic lamp 40 which will flash at the frequency of the rotating crankshaft to cause the mark 42 on the crankshaft to appear stationary or "frozen" at the point of unbalance. The engine may then be balanced by conventional techniques.

Connected to the output of low-pass filters 24 and 26 is a phase meter 54 which indicates the phase of the unknown input relative to the phase of the signal produced by tachometer generator 44. Connected to adder 32 is an amplitude meter 56 which indicates the magnitude of the unknown signal, which magnitude is proportional to the magnitude of the unbalance force. The information from meter 54 or the location of the "frozen" mark on the crankshaft produced by lamp 40 indicates the location of the unbalance as was mentioned above.

It will be appreciated that since the oscillatory voltage produced by tachometer generator 44 varies continually with variations in the speed of rotation of the crankshaft, the center frequency of the filter of the invention continually varies also to thereby accommodate the varying vibrational frequency produced by the transducer 38. Furthermore, from a consideration of the description of FIG. 3, it can be seen that no phase shift occurs in the vibrational signal in passing thorugh the filter, thereby eliminating any need for phase correction networks.

Figure 6:
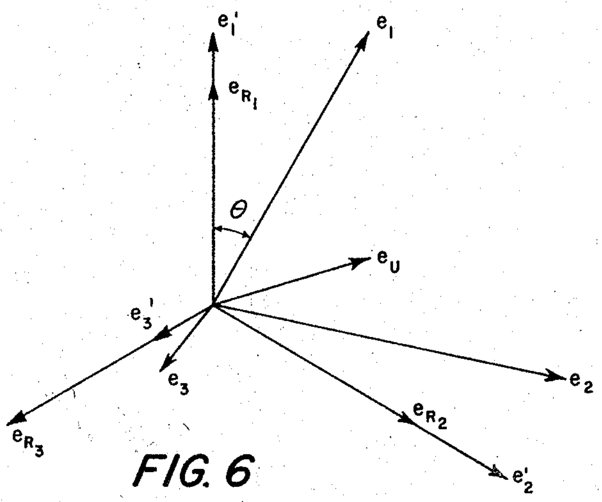
FIG. 6 is a vector diagram illustrating the basic operating principle of another embodiment of the invention.

The theory of operation of alternative embodiments of the band-pass filters of the present invention can best be understood by reference to the vector diagram of FIG. 6. Let us assume, for example, that there are three sources of alternating current voltage, all of the same frequency, but separated in phase by 120°. These signals are represented in FIG. 6 by the vectors $e_{R1}$, $e_{R2}$ and $e_{R3}$. Let us assume further, that the signal to be filtered is represented by the vector $e_U$ and that for the case assumed the frequency of signal $e_U$ is the same as that of $e_{R1}$, $e_{R2}$ and $e_{R3}$. If the input signal $e_U$ is vectorially added with the signal $e_{R1}$, a resultant signal $e_1$ is derived. Similarly, if the input signal $e_U$ is vectorially added with the signal $e_{R2}$, the resultant signal $e_2$ is derived. Finally, by adding the signal $e_U$ with signal $e_{R3}$, the resultant signal $e_3$ is derived. The reflection of the vector $e_1$ on the original vector $e_{R1}$ is identified as $e_1'$. This signal may be represented mathematically as:

$$e_1 \cos \theta$$

where $\theta$ is the angle between the vectors $e_1$ and $e_1'$. In a similar manner, the reflections of signals $e_2$ and $e_3$ on vectors having the phase angles of signals $e_{R2}$ and $e_{R3}$ are identified in FIG. 6 as $e_2'$ and $e_3'$.

If the signals $e_1'$, $e_2'$ and $e_3'$ are now vectorially added, and assuming that the original signal $e_U$ is of the same frequency as $e_{R1}$, $e_{R2}$ and $e_{R3}$, then a signal will be derived which is in phase with the vector $e_U$ and of the same frequency. If, however, the signal $e_U$ is not of the same frequency as $e_{R1}$, $e_{R2}$ and $e_{R3}$, then the vectorial addition of the vectors $e_1'$, $e_2'$ and $e_3'$ will produce a "rotating vector." That is, the vector will rotate about the axis of the vector diagram shown in FIG. 6 so that, over one cycle, the net effect of the rotating vector will be zero output. This, of course, is similar to the principle utilized in connection with the embodiment of FIG. 3. That is, when the input signal $e_U$ is of the same frequency as signals $e_{R1}$, $e_{R2}$ and $e_{R3}$, then an output signal will appear in phase with $e_U$. When, however, the frequency of $e_U$ varies from that of $e_{R1}$, $e_{R2}$ and $e_{R3}$, the aforesaid "rotating vector" will result with zero output. In this manner, all signals other than those of frequency equal to $e_{R1}$, $e_{R2}$, $e_{R3}$, which is the tuned frequency of the filter, will be attenuated, thereby producing a band-pass effect.

The foregoing may be represented mathematically as follows: When the frequency of signal $e_U$ is at the tuned frequency $w$ the vector $e_{R1}$, assuming that it is a sinusoidal electromotive force, may be represented as follows:

$$e_{R1} \cos wt$$

Likewise, the vector $e_1$, assuming that it is a sinusoidal electromotive force may be represented as follows:

$$e_1 \cos (wt+\theta)$$

where $\theta$ is the angle between the vectors $e_{R1}$ and $e_1$ shown in FIG. 6. If we now multiply $(e_{R1} \cos wt)$ by $(e_1 \cos wt+\theta)$ the following results:

$$(e_{R1} \cos wt)(e_1 \cos wt+\theta) = Ke_{R1}e_1 \cos \theta + Ke_{R1}e_1 \cos (2wt+\theta)$$

where K is a constant determined by the circuit parameters.

In the foregoing equation, the quantity $Ke_{R1}e_1 \cos \theta$ is a direct current component having an amplitude proportional to $e_1'$. This corresponds to the signals appearing at A and B in FIG. 3. If the product of the foregoing equation is now passed through a filter or the like to eliminate the alternating current component, the direct current component $Ke_{R1}e_1 \cos \theta$ remains. This corresponds to the signals appearing at C and D in FIG. 3. If this direct current component is now mixed or modulated with the original signal $e_{R1}$, an alternating current signal results equal in frequency and phase to $e_{R1}$ but of amplitude equal to $e_1'$. This signal, then, is the reflection of vector $e_1$ on the vector $e_{R1}$ and corresponds to the signals at E and F in FIG. 3. If the signals $e_1'$, $e_2'$ and $e_3'$ are now vectorially added, an output signal will appear in phase with $e_U$ and of the same frequency as $e_U$.

The case will now be considered where the input signal $e_U$ is of a frequency $w_1$ differing from that, $w$, of the out-of-phase signals $e_{R1}$, $e_{R2}$ and $e_{R3}$. In this case, multiplication of the sinusoidal electromotive forces represented by vectors $e_{R1}$ and $e_1$ is as follows:

$$(e_{R1} \cos wt)(e_1 \cos w_1t+\theta) = \frac{e_{R1}e_1}{2} \cos [w-(w_1+\theta)]t + \frac{e_{R1}e_1}{2} \cos [w+(w_1+\theta)]t$$

The product in this case is a signal of varying phase which, on the vector diagram of FIG. 6, would rotate around the central axis, and the resultant of which is zero. Consequently, it can be seen from the foregoing equations that when the input signal is equal to the frequency of signals $e_{R1}$, $e_{R2}$ and $e_{R3}$, an output signal will appear; whereas when the input signal $e_U$ is not of that frequency, then no output will appear.

Figure 7:
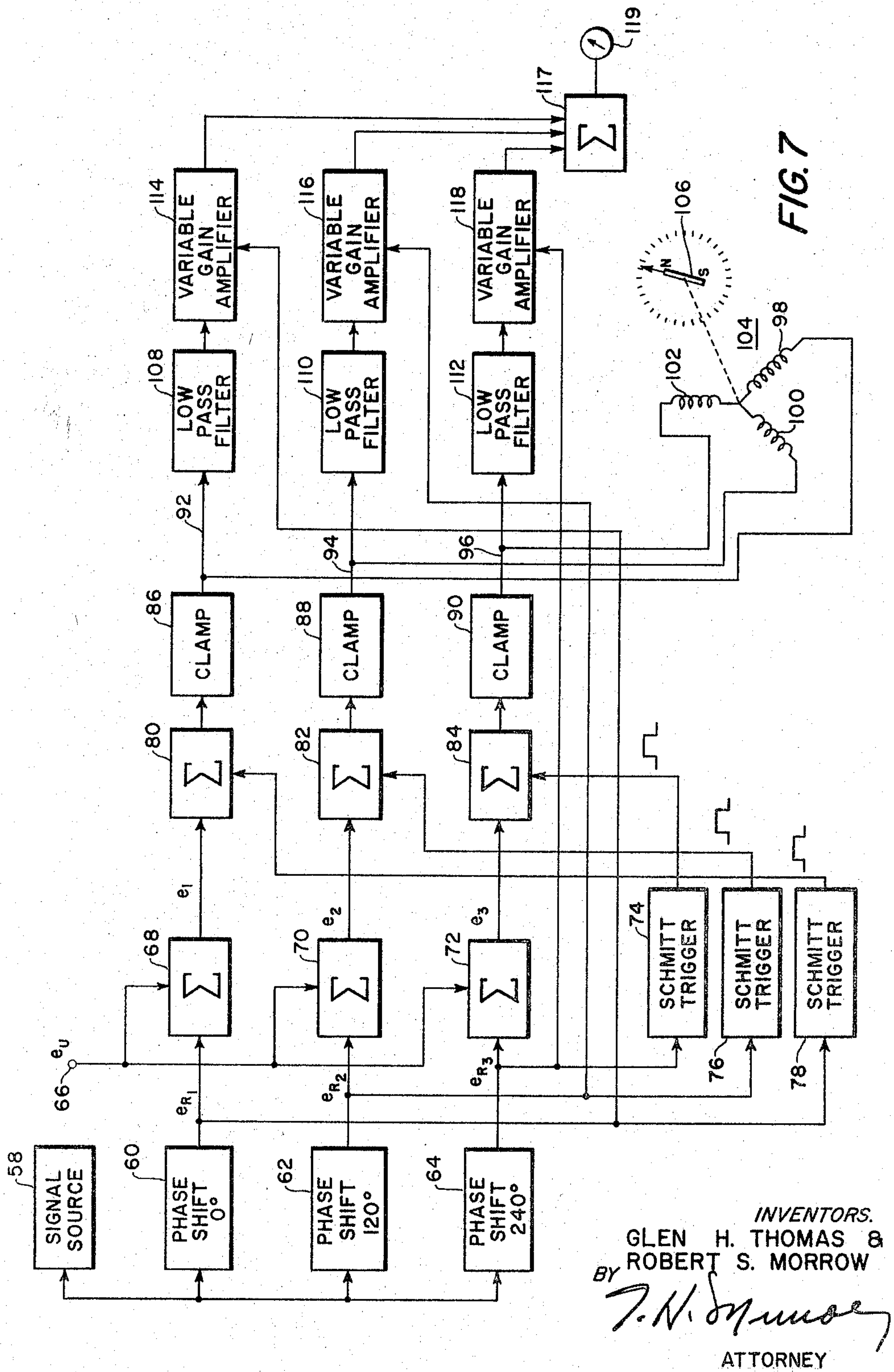
FIG. 7 is a schematic block diagram of another embodiment of the invention employing three sources of oscillatory voltage spaced 120° apart and operable in accordance with the principle set forth in FIG. 6.

One circuit for effecting the procedure shown graphically in FIG. 6 is illustrated in FIG. 7. It includes a signal source 58 which determines the frequency which the filter will pass. The output of the signal source is applied to three phase shift circuits 60, 62 and 64 which produce the three signals $e_{R1}$, $e_{R2}$ and $e_{R3}$ separated in phase by 120°. The input signal $e_U$ is applied to an input terminal 66 and applied to each of three summation networks 68, 70 and 72. Also applied to the summation networks 68, 70 and 72 are the signals $e_{R1}$, $e_{R2}$ and $e_{R3}$, respectively, from the phase shift networks 60–64. By adding the signals $e_{R1}$ and $e_U$, a signal represented by the vector $e_1$ is derived. Similarly, the signals $e_2$ and $e_3$ are derived at the outputs of the summation networks 70 and 72.

It is now necessary to multiply the sinusoidal voltages represented by $e_1$, $e_2$ and $e_3$ with those represented by $e_{R1}$, $e_{R2}$ and $e_{R3}$ in accordance with the equation given above. This is accomplished by means of Schmitt trigger circuits 74, 76 and 78 connected to the outputs of phase shift networks 60, 62 and 64, respectively. As is known, a Schmitt trigger multivibrator is a circuit which will switch stable states to produce an output pulse whenever the amplitude of an input signal applied thereto exceeds a predetermined amplitude. Consequently, the Schmitt trigger circuits 74–78 are adapted to produce output square-wave signals which persist, for example, during that portion of the positive half cycle of an input sine wave which exceeds a predetermined amplitude. The outputs of the Schmitt trigger circuits 74–78 are square-wave signals displaced 120° in phase. These signals are applied to summation networks 80, 82 and 84 connected to the outputs of summation networks 68, 70 and 72, respectively. Since the square waves at the outputs of the Schmitt triggers 74–78 are in phase with the respective vectors $e_{R1}$, $e_{R2}$ and $e_{R3}$ shown in FIG. 6, and since the signals $e_1$, $e_2$ and $e_3$ are also applied to the networks 80–84, it will be appreciated that an effective multiplication of the two signals occurs.

When these signals are passed through clamps 86, 88 and 90, there will appear on leads 92, 94 and 96 signals proportional to the vectors $e_1'$, $e_2'$ and $e_3'$ shown in FIG. 6. These signals may then be applied to the three coils 98, 100 and 102 of a phase meter 104 having a magnetized pointer 106 rotatable around a complete 360° path of travel. Since the three signals $e_1'$, $e_2'$ and $e_3'$ are applied to the three coils 98, 100 and 102 spaced 120° apart around a common center point, their cumulative resultant will have the same phase as vector $e_U$ shown in FIG. 6. Furthermore, since the pointer 106 is rotatable about the center point of coils 98–102, it will point in the direction of vector $e_U$, thereby indicating the phase of the input signal with respect to signals from source 58.

The signals on leads 92, 94 and 96 proportional to $e_1'$, $e_2'$ and $e_3'$ are also applied through low-pass filters 108, 110 and 112 to variable gain direct current amplifiers 114, 116 and 118. Also connected to the amplifiers 114–118 are the original signals $e_{R1}$, $e_{R2}$ and $e_{R3}$ separated in phase by 120°. Since these signals control the gain of amplifiers 114, 116 and 118, an output sinusoidal voltage will be derived from each of the amplifiers 114–118 representative of the vectors $e_1'$, $e_2'$ and $e_3'$. These signals may then be applied to a summation circuit 117, the output of which is connected to an amplitude meter 119. If the frequency of the input signal $e_U$ is the same as that of the signal source 58, constituting the center or tuned frequency of the filter, then the amplitude meter 119 will register an output, this output being proportional to the amplitude of the input signal. On the other hand, if the frequency of the input signal $e_U$ is not equal to that of signal source 58, the amplitude indicated by meter 119 will be zero.

Figure 8:
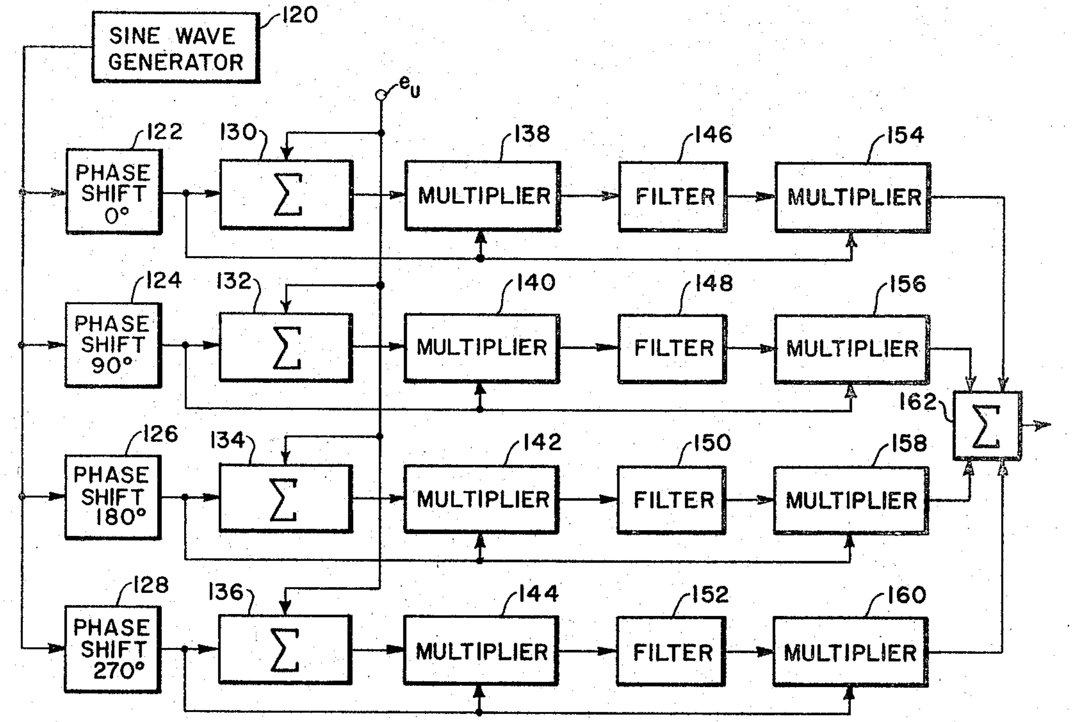
FIG. 8 is a block diagram of another embodiment of the invention employing four sources of oscillatory voltage spaced 90° apart.

It will be apparent from an examination of FIG. 6 that the input signal $e_U$ may be combined with any number of sinusoidal voltages of known frequency and separated in phase. A system employing four sinusoidal voltages is shown in FIG. 8 and includes a sine wave generator 120 connected to each of four phase shift networks 122, 124, 126 and 128 adapted to produce output signals $e_{R1}$, $e_{R2}$, $e_{R3}$ and $e_{R4}$ separated in phase by 90°. These signals are applied to summation networks 130, 132, 134 and 136 where they are combined with the input signal $e_U$ to produce resultant signals which would correspond to the vectors $e_1$, $e_2$ and $e_3$ in FIG. 6, along with a fourth vector $e_4$, not shown in FIG. 6, but represented by the fourth input signal in the system of FIG. 8. The output signals from the summation networks 130–136 are then applied to multiplication circuits 138, 140, 142 and 144 which perform the required multiplication given by the aforementioned equation to produce output signals having a direct current component proportional to $e_1'$, $e_2'$, $e_3'$ and $e_4'$. These signals are passed through filters 146–152 to eliminate the alternating current component. By applying these signals to multipliers 154, 156, 158 and 160 having also applied thereto the original input signals $e_{R1}$ through $e_{R4}$, respectively, sinusoidal output signals are derived which, after summation in circuit 162, will produce an alternating current signal in phase with the original input signal $e_U$, assuming that the input signal is of the same frequency as that generated by generator 120.

If desired, a phase meter could also be connected to the outputs of circuits 146–152 in a manner similar to that of FIG. 7, except that in this latter case the meter would have four coils rather than the three shown in FIG. 7. The multipliers shown in the circuit of FIG. 8 may take various forms. For example, they may comprise a conventional Hall generator. Alternatively, they may comprise a multi-grid modulator or multiplier wherein the two signals are applied to two different grids of a multi-grid vacuum tube whereby the output of the tube is the product of the two input signals.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. Apparatus for attenuating all input signals other than those of a predetermined frequency, comprising a plurality of oscillatory voltage sources all having the same frequency as said predetermined frequency and shifted in phase with respect to each other, means for synchronizing the frequency of an input signal applied to said apparatus with said oscillatory voltage sources, a plurality of signal channels equal in number to the number of oscillatory voltage sources, circuit means in each of said channels responsive to an associated one of said oscillatory voltage sources and an input signal for producing a direct current voltage in that channel, means for multiplying said direct current voltage in each channel by its associated oscillatory voltage source, and means for adding the outputs of said multiplying means to derive an output signal of said predetermined frequency only when the input signal is of said predetermined frequency.

2. The apparatus of claim 1 wherein said input signal is derived from a vibration pickup in contact with a rotating body, and said means for synchronizing the frequency of said input signal with said oscillatory voltage sources includes a device operatively associated with said rotating body for producing sine wave signals comprising said oscillatory voltage sources and having frequencies corresponding to the speed of said rotating body.

3. The apparatus of claim 1 wherein said means in each channel for producing a direct current voltage includes a multiplier separate and apart from the first-mentioned multiplying means, the multiplier being responsive to an associated one of said oscillatory voltage sources and an input signal applied to said apparatus, the magnitudes of the direct current voltages in each channel being proportional to the product of the magnitudes of two vectors representing the input signal and an associated one of said oscillatory voltage sources times a trigonometric function of the angle between the vectors.

4. The apparatus of claim 3 wherein the oscillatory voltage sources and said plurality of channels are each two in number, the oscillatory voltage sources being shifted in phase with respect to each other by 90°.

5. The apparatus of claim 4 wherein the direct current voltage in one of said channels is proportional to the product of the magnitudes of two vectors representing the input signal and one of said oscillatory voltage sources times the cosine of the angle between the vectors, while the direct current voltage in the other channel is proportional to the product of the magnitudes of two vectors representing the input signal and the other of said oscillatory voltage sources times the sine of the angle between the first-mentioned vectors.

6. The apparatus of claim 3 in which the multiplier in each channel produces a composite output signal having an alternating current component and a direct current component which exists only when the input signal is of said predetermined frequency, the direct current component being proportional to the product of the magnitudes of two vectors representing the input signal and an associated one of said oscillatory voltage sources times a trigonometric function of the angle between the vectors, and filter means in each of the channels for eliminating alternating current components whereby a direct current component will appear at the output of the filter means in each channel only when the frequency of the input signal is equal to said predetermined frequency, said direct current component in each channel being multiplied by an associated one of said oscillatory voltage sources in said first-mentioned multiplying means.

7. The apparatus of claim 6 in which the oscillatory voltage sources and said plurality of channels are each two in number, the oscillatory voltage sources being represented by:

$$E_R \sin wt \text{ and } E_R \cos wt$$

respectively, where $w$ is the frequency of the signals and $E_R$ represents their maximum amplitudes, the multiplier in one of said channels being responsive to the sine wave $E_R \sin wt$ and an input sine wave signal represented by $E_U \sin (wt+\theta)$ for producing one of said composite output signals represented by:

$$\frac{E_R E_U}{2}[\cos \theta - \cos (2wt+\theta)]$$

where $E_U$ is the maximum amplitude of the input sine wave signal and $\theta$ is the phase shift between the input signal and the sine wave $E_R \sin wt$, the other multiplier in the other of said channels being responsive to the sine wave $E_R \cos wt$ and said input signal $E_U \sin (wt+\theta)$ for producing a second of said composite signals represented by:

$$\frac{E_R E_U}{2}[\sin \theta + \sin (2wt+\theta)]$$

the direct current component appearing at the output of one of said filter means being represented by:

$$\frac{E_R E_U}{2} \cos \theta$$

and the direct current component in the other channel being represented by:

$$\frac{E_R E_U}{2} \sin \theta$$

References Cited by the Examiner

UNITED STATES PATENTS

| | | | |
|---|---|---|---|
| 2,339,633 | 1/1944 | Gilman | 333—70 |
| 2,584,986 | 2/1952 | Clark | 333—70 |
| 2,979,662 | 4/1961 | Farrow | 328—167 |
| 3,081,434 | 3/1963 | Sandberg | 328—167 |
| 3,085,166 | 4/1963 | Gogia et al. | 328—166 |

FOREIGN PATENTS

| | | |
|---|---|---|
| 729,901 | 5/1955 | Great Britain. |

HERMAN KARL SAALBACH, *Primary Examiner.*